United States Patent
Bradford et al.

(10) Patent No.: US 7,617,499 B2
(45) Date of Patent: *Nov. 10, 2009

(54) CONTEXT SWITCH INSTRUCTION PREFETCHING IN MULTITHREADED COMPUTER

(75) Inventors: Jeffrey Powers Bradford, Rochester, MN (US); Harold F. Kossman, Rochester, MN (US); Timothy John Mullins, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1058 days.

This patent is subject to a terminal disclaimer.

(21) Appl. No.: 10/739,739

(22) Filed: Dec. 18, 2003

(65) Prior Publication Data
US 2005/0138628 A1 Jun. 23, 2005

(51) Int. Cl.
*G06F 9/46* (2006.01)
(52) U.S. Cl. .................................................. 718/108
(58) Field of Classification Search ................ 718/102, 718/108; 395/800; 717/140; 711/3
See application file for complete search history.

(56) References Cited

U.S. PATENT DOCUMENTS

| | | | | |
|---|---|---|---|---|
| 4,860,192 A | * | 8/1989 | Sachs et al. | 711/3 |
| 5,872,985 A | * | 2/1999 | Kimura | 710/1 |
| 5,893,159 A | | 4/1999 | Schneider | |
| 5,907,702 A | * | 5/1999 | Flynn et al. | 718/108 |
| 5,958,045 A | | 9/1999 | Pickett | |
| 6,014,728 A | | 1/2000 | Baror | |
| 6,073,215 A | | 6/2000 | Snyder | |
| 6,202,130 B1 | | 3/2001 | Scales et al. | |
| 6,253,306 B1 | | 6/2001 | Ben-Meir et al. | |
| 6,311,260 B1 | | 10/2001 | Stone et al. | |
| 6,535,962 B1 | | 3/2003 | Mayfield et al. | |
| 6,574,712 B1 | | 6/2003 | Kahle et al. | |
| 6,697,935 B1 | | 2/2004 | Borkenhagen et al. | |
| 6,845,501 B2 | * | 1/2005 | Thompson et al. | 717/140 |
| 6,976,147 B1 | | 12/2005 | Isaac et al. | |
| 7,260,704 B2 | | 8/2007 | Cooksey et al. | |

(Continued)

FOREIGN PATENT DOCUMENTS

CN    1276888    12/2000

(Continued)

OTHER PUBLICATIONS

U.S. Appl. No. 09/458,883, filed Dec. 10, 1999, by Puzak et al.

*Primary Examiner*—Meng-Ai An
*Assistant Examiner*—Eric C Wai
(74) *Attorney, Agent, or Firm*—Wood, Herron & Evans, LLP

(57) ABSTRACT

An apparatus, program product and method initiate, in connection with a context switch operation, a prefetch of at least one instruction likely to be executed by a thread prior to resuming execution of that thread. As a result, once it is known that a context switch will be performed to a particular thread, one or more instructions may be prefetched on behalf of that thread so that when execution of the thread is resumed, those instructions are more likely to be cached, or at least in the process of being retrieved into cache memory, thus enabling a thread to begin executing instructions more quickly than if the thread was required to fetch those instructions upon resumption of its execution.

29 Claims, 4 Drawing Sheets

U.S. PATENT DOCUMENTS

| | | |
|---|---|---|
| 2003/0023663 A1 | 1/2003 | Thompson et al. |
| 2004/0163083 A1* | 8/2004 | Wang et al. ............ 718/102 |
| 2005/0149697 A1 | 7/2005 | Enright et al. |
| 2006/0294347 A1 | 12/2006 | Zou et al. |

FOREIGN PATENT DOCUMENTS

| | | |
|---|---|---|
| CN | 1300006 | 6/2001 |

* cited by examiner

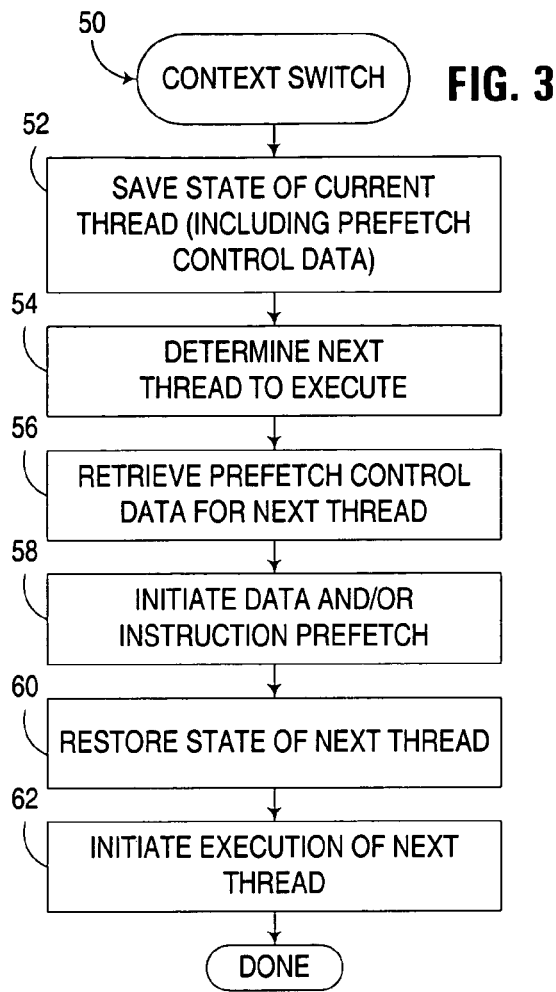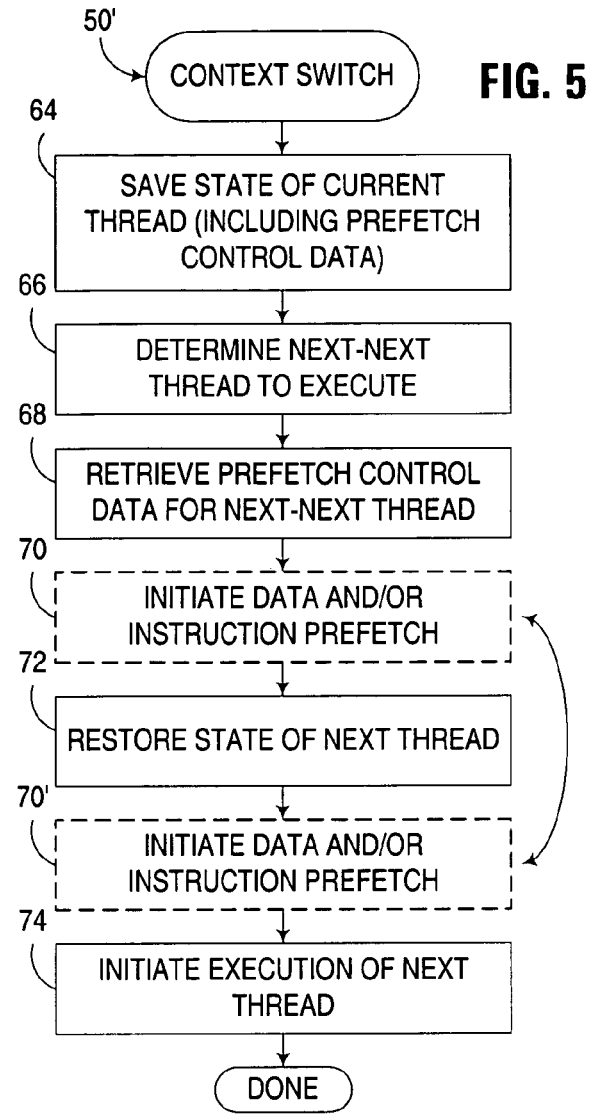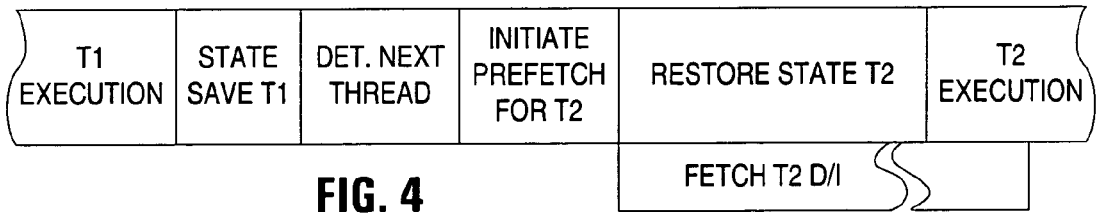
FIG. 4
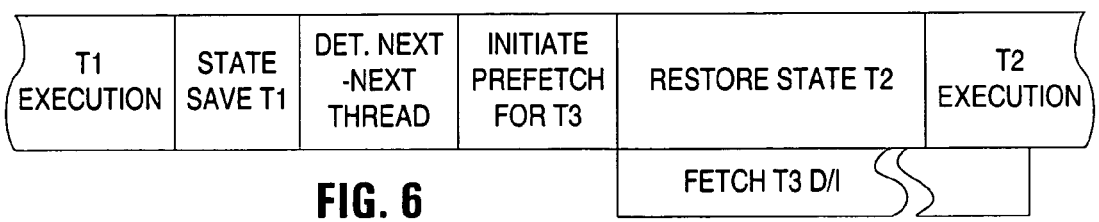
FIG. 6

CONTEXT SWITCH INSTRUCTION PREFETCHING IN MULTITHREADED COMPUTER

CROSS-REFERENCE TO RELATED APPLICATIONS

This application is related to U.S. Ser. No. 10/739,738, filed on even date herewith by Jeffrey P. Bradford et al., and entitled "CONTEXT SWITCH DATA PREFETCHING IN MULTITHREADED COMPUTER," which application is incorporated by reference herein.

FIELD OF THE INVENTION

The invention relates to computers and computer software, and in particular to prefetching of instructions and data in a multithreaded computer system.

BACKGROUND OF THE INVENTION

Given the continually increased reliance on computers in contemporary society, computer technology has had to advance on many fronts to keep up with increased demand. One particular subject of significant research and development efforts is parallelism, i.e., the performance of multiple tasks in parallel.

A number of computer software and hardware technologies have been developed to facilitate increased parallel processing. From a software standpoint, multithreaded operating systems have been developed, which permit computer programs to concurrently execute in multiple "threads" so that multiple tasks can essentially be performed at the same time. Threads generally represent independent paths of execution for a program. For example, for an e-commerce computer application, different threads might be assigned to different customers so that each customer's specific e-commerce transaction is handled in a separate thread.

From a hardware standpoint, computers increasingly rely on multiple microprocessors to provide increased workload capacity. Furthermore, some microprocessors have been developed that support the ability to execute multiple threads in parallel, effectively providing many of the same performance gains attainable through the use of multiple microprocessors. In contrast with single-threaded microprocessors that only support a single path of execution, multithreaded microprocessors support multiple paths of execution such that different threads assigned to different execution paths are able to progress in parallel.

Irrespective of the number of separate execution paths that are supported in the underlying hardware, however, the operating systems in multithreaded computers are typically designed to execute multiple threads on each individual execution path, typically by allocating time slices on each execution path to different threads. While the threads assigned to a given execution path technically are not executed in parallel, by enabling each thread to execute for a period of time and switching between each thread, each thread is able to progress in a reasonable and fair manner and thus maintain the appearance of parallelism.

While multithreading in this nature can significantly increase system performance, however, some inefficiencies exist as a result of switching between executing different threads in a given execution path. In particular, whenever an execution path switches between executing different threads, an operation known as context switch much be performed. A context switch typically consists of saving or otherwise preserving the working state of the thread that was previously being executed, and is now being switched out, and restoring the working state of the thread about to be executed, or switched in.

The working state of a thread includes various state information that characterizes, from the point of view of a thread, the state of the system at a particular point in time, and may include various information such as the contents of the register file(s), the program counter and other special purpose registers, among others. Thus, by saving the working state when a thread is switched out, or suspended, and then restoring the working state when a thread is switched in, or resumed, the thread functionally executes in the same manner as if the thread was never interrupted.

One undesirable side effect of performing a context switch in many environments, however, is the increased occurrence of cache misses once a thread is switched back in. Caching is a technique that has been universally utilized in modern computer architectures, and is used to address the latency problems that result from the speed of microprocessors relative to the speed of the memory devices used by microprocessors to access stored data.

In particular, caching attempts to balance memory speed and capacity with cost by using multiple levels of memory. Often, a computer relies on a relatively large, slow and inexpensive mass storage system such as a hard disk drive or other external storage device, an intermediate main storage memory that uses dynamic random access memory devices (DRAM's) or other volatile memory storage devices, and one or more high speed, limited capacity cache memories, or caches, implemented with static random access memory devices (SRAM's) or the like. Often multiple levels of cache memories are used, each with progressively faster and smaller memory devices. Also, depending upon the memory architecture used, cache memories may be shared by multiple microprocessors or dedicated to individual microprocessors, and may either be integrated onto the same integrated circuit as a microprocessor, or provided on a separate integrated circuit.

Moreover, some cache memories may be used to store both instructions, which comprise the actual programs that are being executed, and the data being processed by those programs. Other cache memories, often those closest to the microprocessors, may be dedicated to storing only instructions or data.

When multiple levels of memory are provided in a computer architecture, one or more memory controllers are typically relied upon to swap needed data from segments of memory addresses, often known as "cache lines", between the various memory levels to attempt to maximize the frequency that requested data is stored in the fastest cache memory accessible by the microprocessor. Whenever a memory access request attempts to access a memory address that is not cached in a cache memory, a "cache miss" occurs. As a result of a cache miss, the cache line for a memory address typically must be retrieved from a relatively slow, lower level memory, often with a significant performance hit.

Caching depends upon both temporal and spatial locality to improve system performance. Put another way, when a particular cache line is retrieved into a cache memory, there is a good likelihood that data from that cache line will be needed again, so the next access to data in the same cache line will result in a "cache hit" and thus not incur a performance penalty.

Other manners of accelerating performance in connection with caching include techniques such as instruction prefetching, branch prediction and data prefetching. Instruction prefetching, for example, is typically implemented in a microprocessor, and attempts to fetch instructions from memory before they are needed, so that the instructions will hopefully be cached when they are actually needed. Branch prediction, which is also typically implemented in a microprocessor, extends instruction prefetching by attempting to predict which branch of a decision will likely be taken, and then prefetching instructions from the predicted branch. Data prefetching, which is often implemented in a separate component from a microprocessor (but which may still be disposed on the same integrated circuit device), attempts to detect patterns of data access and prefetch data that is likely to be needed based upon any detected patterns.

From the perspective of an executing thread, therefore, as a particular thread executes, more and more of the instructions and data used by a thread will progressively become cached, and thus the execution of the thread will tend to be more efficient the longer the thread is executed.

However, given that the same premise applies to all of the threads executing in a multithreaded computer, whenever a thread is suspended as a result of a context switch, and then is later resumed as a result of another context switch, it is likely that some or all of the instructions and data that were cached prior to suspending the thread will no longer be cached when the thread is resumed (principally due to the caching of instructions and data needed by other threads that were executed in the interim). A greater number of cache misses then typically occur, thus negatively impacting overall system performance. Prefetching and branch prediction, which rely on historical data, also typically provide little or no benefit for a resumed thread upon its initial resumption of execution, as the prefetching of instructions and data cannot be initiated until after the thread resumes its execution.

Therefore, a significant need has arisen in the art for a manner of minimizing the adverse performance impact associated with context switching in a multithreaded computer.

SUMMARY OF THE INVENTION

The invention addresses these and other problems associated with the prior art by initiating, in connection with a context switch operation, a prefetch of at least one instruction likely to be executed by a thread prior to resuming execution of that thread. Put another way, once it is known that a context switch will be performed to a particular thread, embodiments consistent with the invention initiate prefetching of one or more instructions on behalf of that thread so that when execution of the thread is resumed, those instructions are more likely to be cached, or at least in the process of being retrieved into cache memory. As a result, in many instances a thread is able to begin executing instructions more quickly than if the thread was required to fetch those instructions upon resumption of its execution.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 3 is a flowchart illustrating the program flow of a context switch routine executed by the apparatus of FIG. 1.

FIG. 4 is a functional timeline illustrating the sequence of operations occurring during execution of the context switch routine of FIG. 3.

FIG. 5 is a flowchart illustrating the program flow of an alternate context switch routine to that illustrated in FIG. 3.

FIG. 6 is a functional timeline illustrating the sequence of operations occurring during execution of the context switch routine of FIG. 5.

DETAILED DESCRIPTION

The embodiments discussed hereinafter utilize context switch prefetching to prefetch data likely to be used by a thread prior to resumption of execution of the thread. In this context, data that is likely to be used by a thread may be considered to include both the instructions that are executed by a thread, as well as the data that is processed by those instructions as a result of their execution.

As will become more apparent below, context switch prefetching may be used to prefetch data for a thread in connection with a context switch to that thread, or in the alternative, in connection with a context switch to another thread (e.g., when the thread for which the data is prefetched will be resumed upon the next context switch). Moreover, the prefetching may be software- or hardware-based, and may be performed for instructions, data to be processed by instructions, or both. Various methods of initiating a prefetch, including issuing a touch instruction, programming a hardware prefetcher and/or writing control data to a buffer, may also be used.

Furthermore, the types of state information that may be stored in connection with saving the working state of a thread, and later used to initiate a prefetch during a context switch, may vary in different embodiments. For example, for prefetching instructions, state information such as a program counter, branch prediction information, hardware prefetcher state information, and/or cache state information such as tag array data, most-recently-used (MRU) data and/or way prediction data (among others), may be used. Likewise, for prefetching data processed by instructions, state information such as cache history information, hardware prefetcher state information, base addresses and strides used in connection with data prefetching, and/or cache state information such as tag array data, most-recently-used (MRU) data and/or way prediction data (among others), may be used. Furthermore, precisely when during a context switch a prefetch is initiated can vary in different embodiments, e.g., before restoring a working state, while restoring a working state, after restoring a working state, or even during execution of another thread scheduled for execution prior to resumption of the thread for which the prefetch is to be initiated.

It will be appreciated that a number of other modifications and variations may be utilized in other embodiments consistent with the invention. The invention is therefore not limited to the specific embodiments disclosed hereinafter.

Figure 1:
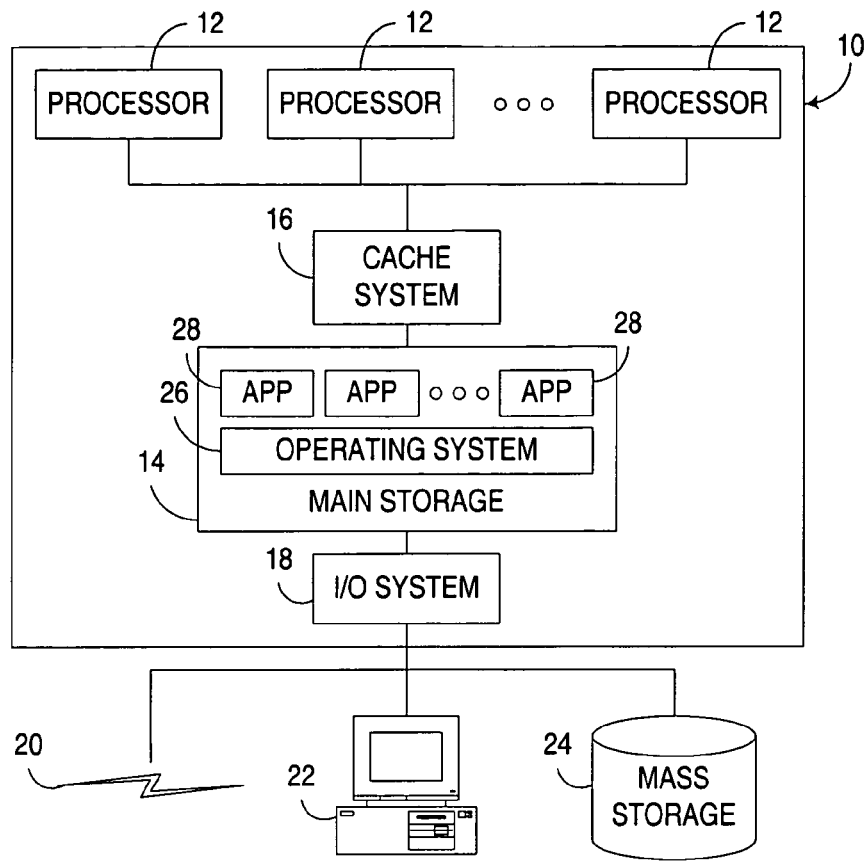
FIG. 1 is a block diagram of an exemplary apparatus incorporating context switch prefetching consistent with the invention.

Turning now to the Drawings, wherein like numbers denote like parts throughout the several views, FIG. 1 illustrates a computer 10 incorporating context switch prefetching consistent with the invention. Computer 10 generically represents, for example, any of a number of multi-user computers such as a network server, a midrange computer, a mainframe computer, etc. However, it should be appreciated that the invention may be implemented in other computers and data processing systems, e.g., in single-user computers such as workstations, desktop computers, portable computers, and the like, or in other programmable electronic devices (e.g., incorporating embedded controllers and the like), such as set top boxes, game machines, etc.

Computer 10 generally includes one or more system processors 12 coupled to a main storage 14 through one or more levels of cache memory disposed within a cache system 16. Furthermore, main storage 14 is coupled to a number of types of external devices via a system input/output (I/O) system 18, e.g., one or more networks 20, one or more workstations 22 and one or more mass storage devices 24. Any number of alternate computer architectures may be used in the alternative.

Also shown resident in main storage 14 is a typical software configuration for computer 10, including an operating system 26 (which may include various components such as kernels, device drivers, runtime libraries, etc.) accessible by one or more applications 28. As will become more apparent below, context switch prefetching is typically implemented in whole or in part in an operating system, and in particular, within the thread management and scheduling components thereof. Moreover, as will also become more apparent below, context switch prefetching may be implemented with or without dedicated hardware components and/or modifications to conventional hardware components, and in particular, purely via software executing on a conventional hardware platform.

In general, the software-implemented portions of the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable signal bearing media include but are not limited to recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Figure 2:
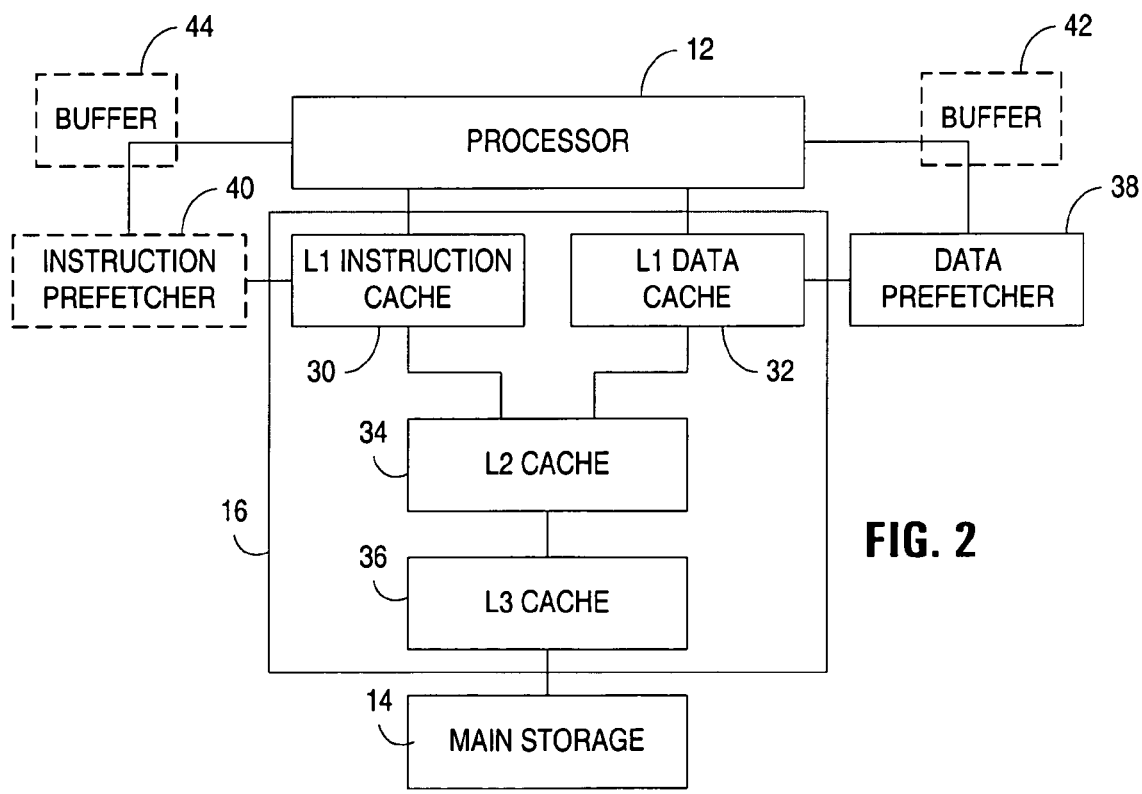
FIG. 2 is a block diagram of the interconnection of a processor with a main storage via a cache system in the apparatus of FIG. 1.
Figure 7:
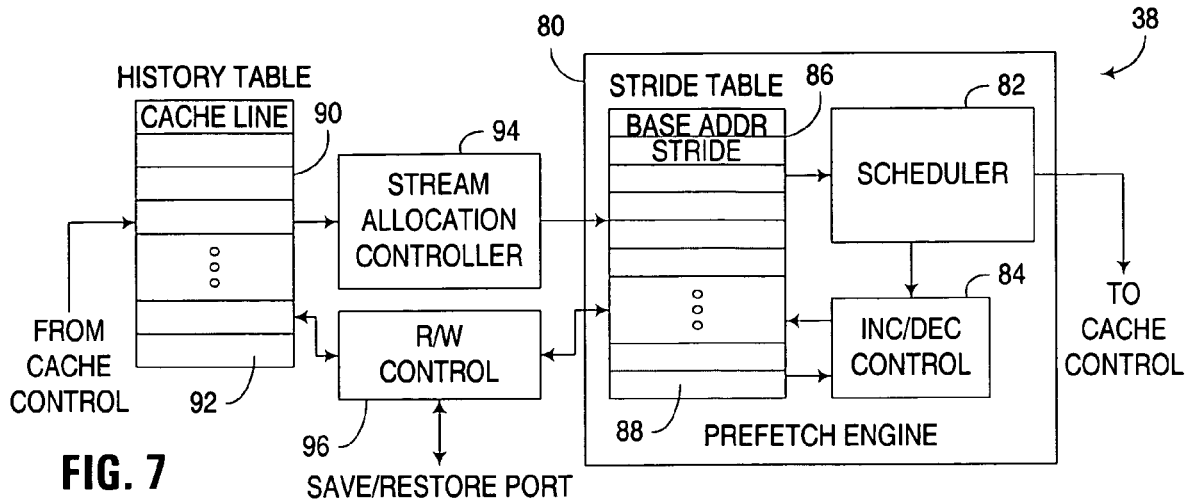
FIG. 7 is a block diagram of an exemplary implementation of the data prefetcher referenced in FIG. 2.

FIG. 2 next illustrates the interconnection of one of processors 12 from computer 10 with main storage 14 via cache system 16. In the illustrated implementation, cache system 16 is shown including three levels of cache memory, with a first level (L1) including separate instruction and data caches 30, 32, and with second and third level (L2 and L3) caches 34, 36 configured to cache both instructions and data. As is known in the art, each of caches 30-36 may be integrated onto the same integrated circuit device or chip as processor 12, or may be disposed on one or more external chips. Moreover, each of caches 30-36 may be dedicated to processor 12, or shared by processor 12 with one or more additional processors. Furthermore, as noted above, any processor 12 may include one or more cores providing separate paths of execution, and one or more cache memories may be dedicated to individual cores in some implementations.

Consistent with the invention, a context switch operation is utilized to initiate a prefetch of data likely to be used by a thread, prior to resumption of execution of that thread. In this regard, a prefetch of data may result in the retrieval of data into any or all of the cache memories in a cache system.

Moreover, initiation of a prefetch may be performed entirely in software, entirely in hardware, or using a combination of hardware and software. In this regard, for implementations that are wholly or partially reliant on hardware, a hardware-based prefetcher, e.g., a data prefetcher 38, may be used to provide data prefetching functionality. In addition, in some embodiments, it may be desirable to additionally include hardware-based prefetching of instructions, e.g., using an instruction prefetcher 40. In some embodiments, the functionality of prefetchers 38 and 40 may be combined. In other implementations, a cache controller may be configured to be controlled directly to prefetch instructions and/or data during a context switch as required.

A hardware-based prefetcher typically includes functionality to provide commands to a cache controller in cache system 16 and/or to main storage 14 to initiate the retrieval of data in a particular cache line. As will become more apparent below, many conventional data prefetchers attempt to detect patterns in data access, and prefetch data according to such detected patterns. Instruction prefetchers, on the other hand, often are incorporated directly into a processor, and typically prefetch based upon the instruction stream, often by prefetching subsequent cache lines to that pointed to be the program counter, and optionally using branch prediction to prefetch instructions from one or more decision paths.

To control a hardware-based prefetcher in response to a context switch, a number of different configurations may be used. For example, a prefetcher may be directly readable and writable by a processor to implement software-based control. In other embodiments, a buffer, e.g., one of buffers 42, 44, which may be logical or physical in nature, may be used to store prefetch control data that is read out by a prefetcher to prefetch data. For example, in some embodiments, software may write prefetch control data to such a buffer, and a prefetcher may be configured to read out the prefetch control data in response to detection of a context switch. In addition, in some embodiments, a write to a buffer may be used to trigger a prefetch by a hardware prefetcher.

Where initiation of a prefetch is entirely implemented in software, such initiation may be implemented, for example, through the use of dedicated instructions, such as touch instructions (e.g., debt in the PowerPC ISA), or through execution of load or store instructions to appropriate memory addresses (which are then handled by the cache system if the memory addresses are not cached).

Now turning to FIG. 3, an exemplary implementation of a context switch routine 50 is illustrated. Routine 50 may be executed, for example, by the scheduling logic of a multi-threaded operating system Routine 50 may also be executed by other operating system components and/or within a runtime library, and may be triggered by a number of different events. For example, a context switch may be triggered by expiration of a hardware or software timer, e.g., once a time slice allocated to a thread has expired. A context switch may also be triggered by a thread voluntarily releasing or suspending, e.g., if the thread is waiting on a disk access. A context switch may also be triggered by a preemptive action such as a higher priority thread or an interrupt.

Routine 50 begins in block 52 by saving the working state of the current thread being executed, including any prefetch control data as needed to indicate what data and/or instructions should be prefetched prior to resumption of execution of the thread. Next, block 54 determines which thread should be executed, e.g., using any number of known thread scheduling algorithms, e.g., a round-robin algorithm. Block 56 then retrieves the stored prefetch control data for the next thread, and block 58 initiates a data and/or instruction prefetch on behalf of the next thread, using any of the variations discussed herein. Block 60 then restores the working state of the next thread, in a manner generally known in the art. Execution of the next thread is then resumed in block 62, and routine 50 is complete.

As shown in FIG. 4, which illustrates the chronological progression during a context switch from a thread T1 to a thread T2, initiation of a prefetch prior to restoring the working state of thread T2 enables the fetching of data and/or instructions to occur in parallel with restoration in the working state of thread T2. As such, when thread T2 resumes execution, some or all of the data and/or instructions used by the thread will be cached, or at least in the process of being cached.

As such, initiation of the prefetch during the context switch of FIG. 4 occurs prior to resuming execution of thread T2, as well as prior to restoring the working state for thread T2. However, it will be appreciated that initiation of a prefetch may occur in other sequences. For example, initiation of a prefetch may occur concurrently with or otherwise during restoration of a working state, or even prior to saving the working state of the thread being suspended. In addition, as illustrated by routine 50' of FIG. 5, initiation of a prefetch on behalf of a thread may occur prior to even the context switch to that thread.

In particular, routine 50' illustrates an implementation of a context switch routine where initiation of a prefetch on behalf of a thread occurs during a context switch to another thread scheduled for execution prior to that thread, e.g., immediately prior thereto. Routine 50' begins in block 64 by storing the state of the current thread. Next, block 66 determines the next-next thread to be executed, i.e., the thread that will be executed after the thread to which this context switch pertains has resumed execution. Block 68 then retrieves the prefetch control data for the next-next thread. Thereafter, block 70 initiates a prefetch of data and/or instructions on behalf of the next-next thread, and blocks 72 and 74 respectively restore the state of the next thread and initiate execution of the thread.

As represented by block 70', which may be executed in lieu of block 70, it may be desirable to initiate prefetching at other points during routine 50', e.g., after restoring the state of the next thread. In addition, in other embodiments, initiating a prefetch may occur at any point in the context switch, and may even occur during execution of the next thread, but prior to the subsequent context switch to the next-next thread.

Thus, as illustrated in FIG. 6, the chronological progression of a context switch from a thread T1 to a thread T2 is illustrated. In this context switch, a next-next thread (here designated as thread T3) is determined, and data and/or instructions are prefetched during the context switch. Given that the execution of thread T2 and the context switch to thread T3 still must occur prior to usage of the data and/or instructions prefetched on behalf of thread T3, it will be appreciated that routine 50' in general provides additional time to ensure that more necessary data and/or instructions will be cached upon resuming execution of a suspended thread.

It will also be appreciated that, in the context of the invention, initiation of a prefetch prior to resuming execution of a thread does not necessarily result in the process of fetching data and/or instructions being complete as of resumption of execution of the thread, or even that active data transfer will be initiated as of resumption of execution. So long as the process of prefetching is initiated prior to such resumption, and typically while the thread is suspended, it is anticipated that the latency associated with retrieving needed data and/or instructions will be improved versus retrieving the data/instructions as needed during execution of the thread.

As noted above, the type of state information that may be stored as part of the working state of a thread, and which may be used to generate prefetch control data used in the initiation of prefetching, may vary in different embodiments. For example, for prefetching instructions, state information such as a program counter, branch prediction information, hardware prefetcher state information, and/or cache state information such as tag array data, most-recently-used (MRU) data and/or way prediction data (among others), may be used. Likewise, for prefetching data processed by instructions, state information such as cache history information, hardware prefetcher state information, base addresses and strides used in connection with data prefetching, and/or cache state information such as tag array data, most-recently-used (MRU) data and/or way prediction data (among others), may be used.

One exemplary implementation of hardware-based data prefetcher 38, for example, includes a prefetch engine 80 with a scheduler block 82 that interfaces with an increment/decrement control block 84 that updates entries 88 in a stride table

86. Each entry 88, in particular, includes a base address value and a stride value, with the base address value representing a current address to be fetched, and the stride value representing the amount to add or subtract from the base address to generate a next address to be fetched.

Data prefetcher 38 generally operates by attempting to discern access patterns among memory accesses, and predicting which data will likely be needed based upon those patterns. More specifically, once a base address and stride value are determined, the base address is fetched via a command from scheduler 82 to the cache system, and the base address is summed with the stride value by increment/decrement control block 84, with the new base address value written back into the table. Scheduler 82 additionally arbitrates between multiple entries, and throttles the issuance of cache fetch requests based upon cache workload information provided by the cache system.

Entries 88 may or may not each be associated with particular threads. The initial values stores in the entries are typically determined by analyzing a history table 90 having entries 92 for the last N cache lines accessed (or alternatively the last N addresses accessed). A stream allocation controller 94 performs such analysis and stores appropriate values in stride table 96 for regular strides that are detected in the data access pattern.

In the illustrated embodiment, it may be desirable to store state information from stride table 86, history table 90, or both, in connection with context switch prefetching. In this regard, it may be desirable to provide a read/write control block 96 to provide a save/restore port for processor access to the prefetcher. In addition, the prefetch control data that initiates prefetching on behalf of a thread may use the save/restore port to update the state of the prefetcher, e.g., by restoring the state of particular entries in either or both of tables 86, 90. Where certain entries are only associated with particular threads, for example, it may be desirable to save and restore only those entries that are relevant for a particular thread.

In addition, it may be desirable to provide the ability to modify an entry in either table. For example, in the case of stride-based prefetching, it may be desirable to redo one or more previous fetching operations. In such an instance, for example, it may be desirable to subtract one or a multiple of the stride value from the current base address stored as a result of a context switch, prior to storing the base address in the stride value. In many instances, this results in repeating one or more prior fetch operations that were performed prior to suspension of a thread. In other embodiments, it may be desirable to simply utilize the history table to identify cache lines that should be prefetched on behalf of a particular thread. It will also be appreciated that the invention may be used with other types of hardware prefetchers, e.g., those that attempt to prefetch linked lists, irregular strides, etc.

Figure 8:
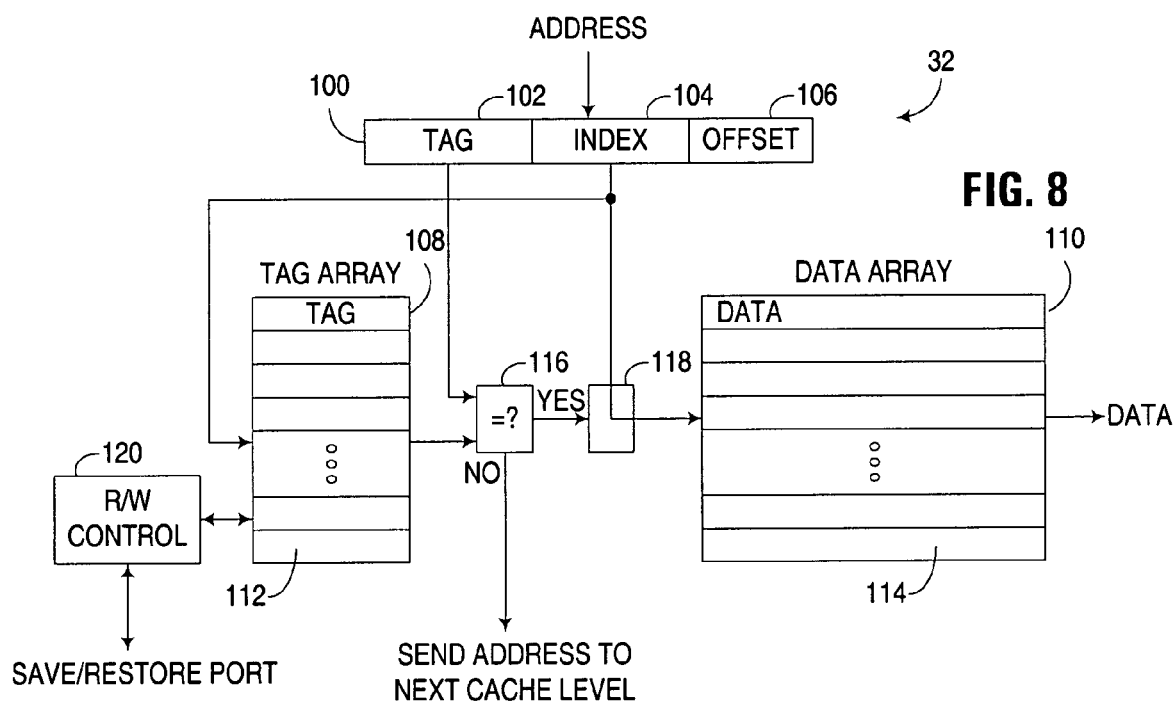
FIG. 8 is a block diagram of an exemplary implementation of the L1 data cache referenced in FIG. 2.

As another example of state information that may be saved and/or restored in connection with context-based prefetching, FIG. 8 illustrates one implementation of data cache 32 in greater detail. In this implementation, data cache 32 is a direct mapped (non-associative) cache. The cache is accessed via addresses 100 that are partitioned into tag, index and offset fields 102, 104, 106. Index 104 is used to index a tag array 108, which stores tags, and a data array 110, which stores cache lines, in entries 112, 114, respectively. A decision block 116 compares the tag stored at an entry 112 in tag array 110 with the tag field 102 of a provided address. Upon finding a match (indicating a cache hit), the index 104 is provided via a block 118 to data array 110, resulting in the output of the cache line stored at the indexed entry 114. Upon not finding a match (indicating a cache miss), block 116 passes the address to the next level of cache to request that the cache line for the requested address be retrieved from that other cache.

From the perspective of context switch prefetching, it may be desirable to retrieve the contents of tag array 108 and store such contents as part of the state information for a thread, e.g., via a read/write control block 120. Thereafter, the tag data may be used to request cache lines identified by the tag array as being previously cached (it will be appreciated that the index for a particular tag array entry can be derived from its position in the array when it is desirable to generate a cache line for a tag array entry). Moreover, while cache 32 is implemented as a direct-mapped cache, in other embodiments associative, or multi-way caches, may be used. In such instances, it may also be desirable to store other cache state data, e.g., MRU data and/or way prediction data.

It will also be appreciated that analysis of data and/or instruction access patterns may occur purely in software, e.g., by analyzing instruction data flow. The invention is therefore not limited to the particular hardware implementations discussed herein.

Now turning to FIGS. 9-12, four specific implementations of prefetch initiation consistent with the invention are shown. It will be appreciated that multiple of such routines may be executed in any given context switch.

Figure 9:
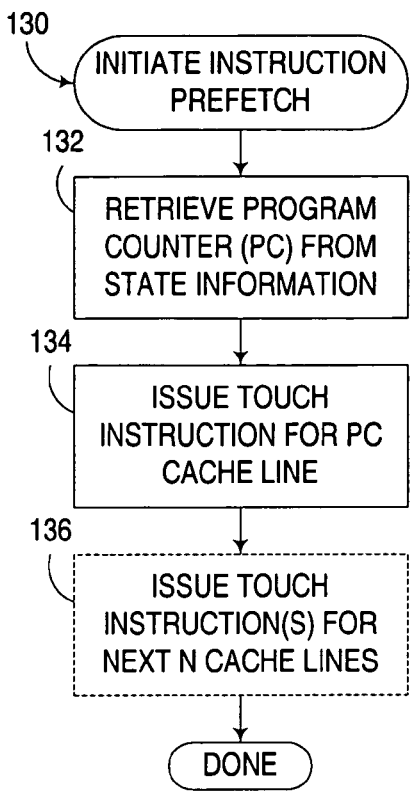
FIG. 9 is a flowchart illustrating the program flow of an exemplary initiate instruction prefetch routine executed by the apparatus of FIG. 1 during a context switch.

FIG. 9 illustrates an initiate instruction prefetch routine 130 that implements software-based instruction prefetching. Routine 130 begins in block 132 by retrieving a program counter (PC) stored in the state information for a thread. Block 134 then issues a touch instruction, or any other appropriate memory access instruction, to the cache line pointed to by the PC. Thereafter, block 136 optionally initiates prefetching for other cache lines. For example, it may be desirable to initiate prefetching for the next N cache lines following that identified by the PC. It may also be desirable in other embodiments to prefetch other execution paths, e.g., using branch prediction data incorporated into the state information such as in a Branch Target Address Cache (BTAC).

Figure 10:
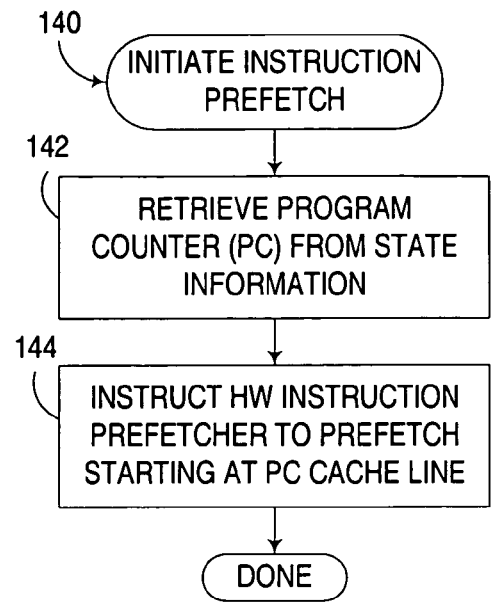
FIG. 10 is a flowchart illustrating the program flow of another exemplary initiate instruction prefetch routine executed by the apparatus of FIG. 1 during a context switch.

FIG. 10 illustrates an alternate initiate instruction prefetch routine 140 that implements hardware-based instruction prefetching. Routine 140 begins in block 142 by retrieving the PC stored in the state information for the thread. Block 144 then instructs the hardware instruction prefetcher to prefetch one or more cache lines starting with that identified by the PC. As above, such prefetching may simply prefetch adjacent cache lines and/or prefetch other cache lines based upon branch prediction techniques.

Figure 11:
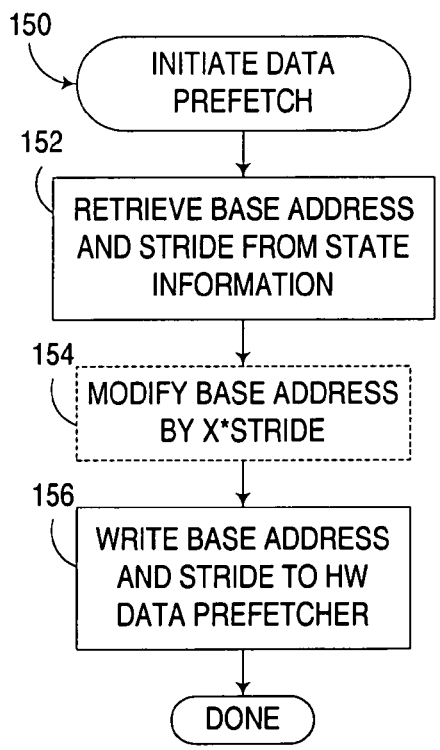
FIG. 11 is a flowchart illustrating the program flow of an exemplary initiate data prefetch routine executed by the apparatus of FIG. 1 during a context switch.

FIG. 11 illustrates an initiate data prefetch routine 150 that implements stride-based data prefetching. Routine 150 begins in block 152 by retrieving a base address and stride value from the state information. Block 154 then optionally modifies the base address by subtracting one or a multiple of the stride value from the base address, effectively redoing prior data accesses. Block 156 then writes the (potentially modified) base address and stride value into a hardware data prefetcher. As a result of such an update, the hardware data prefetcher will then begin prefetching starting at the base address.

Figure 12:
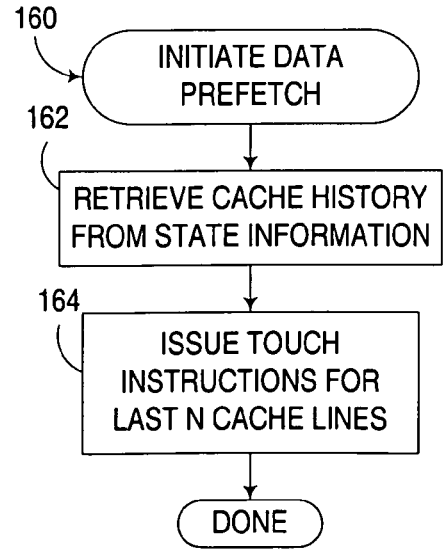
FIG. 12 is a flowchart illustrating the program flow of another exemplary initiate data prefetch routine executed by the apparatus of FIG. 1 during a context switch.

FIG. 12 illustrates an alternate initiate data prefetch routine 160 that performs cache line- or record-based prefetching. Routine 160 begins in block 162 by retrieving a cache history from state information for the thread, e.g., using data retrieved from a tag array and/or a history table. Block 164 then issues touch instructions, or other appropriate memory access instructions, for the last N cache lines, thus effectively repeating data access activities that occurred during prior executions of a thread.

Various additional modifications may be made to the illustrated embodiments without departing from the spirit and scope of the invention. Therefore, the invention lies in the claims hereinafter appended.

What is claimed is:

1. A method of performing a context switch operation in a multithreaded computer, the method comprising initiating a prefetch of at least one instruction likely to be executed by a thread prior to resuming execution of the thread, wherein initiating the prefetch includes:
retrieving state information associated with a working state of the thread, wherein the retrieved state information is stored during a prior context switch from the thread and includes a program counter;
selecting a prefetch address for the instruction to be prefetched based upon the program counter from the retrieved state information; and
initiating a prefetch of a cache line for the selected prefetch address and at least one immediately succeeding cache line;
wherein initiating the prefetch includes storing prefetch control data for the thread in a buffer, the method further comprising retrieving the prefetch control data from the buffer and performing a prefetch operation based during the prefetch control data, and wherein initiating the prefetch occurs during suspension of the thread.

2. The method of claim 1, further comprising:
restoring a working state for the thread; and
resuming execution of the thread upon restoration of the working state therefor.

3. The method of claim 2, wherein initiating the prefetch is performed while restoring the working state for the thread.

4. The method of claim 2, wherein initiating the prefetch is performed prior to restoring the working state for the thread.

5. The method of claim 1, wherein the context switch operation includes context switching to another thread scheduled for execution prior to a context switch to the thread.

6. The method of claim 5, wherein initiating the prefetch is performed during at least one of restoring a working state for the other thread and resuming execution of the other thread.

7. The method of claim 5, initiating the prefetch is performed responsive to the thread being scheduled for execution immediately after execution of the other thread.

8. The method of claim 1, wherein the state information includes hardware prefetcher state information, and wherein initiating the prefetch further includes initializing a hardware prefetcher using the hardware prefetcher state information.

9. The method of claim 1, wherein initiating the prefetch includes initiating a prefetch based upon branch prediction information.

10. The method of claim 1, wherein initiating the prefetch includes instructing a hardware prefetcher to prefetch the instruction.

11. The method of claim 10, wherein instructing the hardware prefetcher is performed by an operating system in the computer.

12. The method of claim 1, wherein initiating the prefetch includes executing a touch instruction.

13. The method of claim 12, wherein executing the touch instruction is performed by an operating system in the computer.

14. The method of claim 1, further comprising retrieving the at least one instruction into a cache memory in response to initiating the prefetch.

15. The method of claim 1, further comprising initiating a prefetch of data likely to be processed by at least one instruction executed by the thread prior to resuming execution of the thread.

16. An apparatus, comprising:
at least one processor configured to execute a plurality of threads; and
program code configured to perform a context switch operation by initiating a prefetch of at least one instruction likely to be executed by a thread among a plurality of threads prior to resuming execution of the thread, wherein the program code is configured to initiate the prefetch by:
retrieving state information associated with a working state of the thread, wherein the retrieved state information is stored during a prior context switch from the thread and includes a program counter;
selecting a prefetch address for the instruction to be prefetched based upon the program counter from the retrieved state information; and
initiating a prefetch of a cache line for the selected prefetch address and at least one immediately succeeding cache line;
wherein the program code is further configured to initiate the prefetch by storing prefetch control data for the thread in a buffer, retrieving the prefetch control data from the buffer and performing a prefetch operation based upon the prefetch control data, and wherein the program code is configured to initiate the prefetch during suspension of the thread.

17. The apparatus of claim 16, wherein the program code is further configured to restore a working state for the thread and execute the thread upon restoration of the working state therefor.

18. The apparatus of claim 17, wherein the program code is configured to initiate the prefetch while restoring the working state for the thread.

19. The apparatus of claim 17, wherein the program code is configured to initiate the prefetch prior to restoring the working state for the thread.

20. The apparatus of claim 16, wherein the program code is configured to perform the context switch operation by context switching to another thread scheduled for execution prior to a context switch to the thread.

21. The apparatus of claim 20, wherein the program code is configured to initiate the prefetch during at least one of restoring a working state for the other thread and resuming execution of the other thread.

22. The apparatus of claim 20, wherein the program code is configured to initiate the prefetch responsive to the thread being scheduled for execution immediately after execution of the other thread.

23. The apparatus of claim 16, wherein the program code is configured to initiate the prefetch by initiating a prefetch based upon branch prediction information.

24. The apparatus of claim 16, further comprising a hardware prefetcher, wherein the state information includes hardware prefetcher state information, and wherein the program code is configured to initiate the prefetch by initializing the hardware prefetcher using the hardware prefetcher state information.

25. The apparatus of claim 16, further comprising a hardware prefetcher, wherein the program code is configured to initiate the prefetch by instructing the hardware prefetcher to prefetch the data.

26. The apparatus of claim 16, wherein the program code is configured to initiate the prefetch by executing a touch instruction.

27. The apparatus of claim 16, further comprising a cache memory, wherein the program code is further configured to retrieve the at least one instruction into the cache memory in response to initiating the prefetch.

28. The apparatus of claim 16, wherein the program code is further configured to initiate a prefetch of data likely to be processed by at least one instruction executed by the thread prior to resuming execution of the thread.

29. A program product, comprising:

a recordable computer readable medium; and program code stored on the recordable computer readable medium and configured upon execution to perform a context switch to a thread among a plurality of threads in a multi-threaded computer by initiating a prefetch of at least one instruction likely to be executed by the thread prior to resuming execution of the thread, wherein the program code is configured to initiate the prefetch by:

retrieving state information associated with a working state of the thread, wherein the retrieved state information is stored during a prior context switch from the thread and includes a program counter;

selecting a prefetch address for the instruction to be prefetched based upon the program counter from the retrieved state information; and initiating a prefetch of a cache line for the selected prefetch address and at least one immediately succeeding cache line;

wherein the program code is further configured to initiate the prefetch by storing prefetch control data for the thread in a buffer, retrieving the prefetch control data from the buffer and performing a prefetch operation based upon the prefetch control data, and wherein the program code is configured to initiate the prefetch during suspension of the thread.

* * * * *

UNITED STATES PATENT AND TRADEMARK OFFICE
CERTIFICATE OF CORRECTION

PATENT NO. : 7,617,499 B2
APPLICATION NO. : 10/739739
DATED : November 10, 2009
INVENTOR(S) : Bradford et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1726 days.

Signed and Sealed this

Nineteenth Day of October, 2010

David J. Kappos
*Director of the United States Patent and Trademark Office*